US008660682B2

(12) United States Patent
Hofman et al.

(10) Patent No.: US 8,660,682 B2
(45) Date of Patent: Feb. 25, 2014

(54) AIR WIPE AND SHEET GUIDE TEMPERATURE CONTROL ON PAPER AND CONTINUOUS WEB SCANNERS

(75) Inventors: Gertjan Hofman, Vancouver (CA); Ron Beselt, Burnaby (CA)

(73) Assignee: Honeywell ASCa Inc., Mississauga (CA)

(*) Notice: Subject to any disclaimer, the term of this patent is extended or adjusted under 35 U.S.C. 154(b) by 737 days.

(21) Appl. No.: 12/951,723

(22) Filed: Nov. 22, 2010

(65) Prior Publication Data

US 2012/0130526 A1   May 24, 2012

(51) Int. Cl.
  *G06F 19/00*   (2011.01)
(52) U.S. Cl.
  USPC .......................................... 700/122; 700/129
(58) Field of Classification Search
  USPC .................................................. 700/122–129
  See application file for complete search history.

(56) References Cited

U.S. PATENT DOCUMENTS

| 3,961,425 A | 6/1976 | Swanson et al. |
|---|---|---|
| 4,692,616 A | 9/1987 | Hegland et al. |
| 5,092,678 A | 3/1992 | Chase et al. |
| 5,166,748 A | 11/1992 | Dahlquist |
| 5,654,799 A | 8/1997 | Chase |
| 5,714,763 A | 2/1998 | Chase et al. |
| 5,773,714 A | 6/1998 | Shead |
| 5,793,486 A | 8/1998 | Gordon et al. |
| 6,106,671 A | 8/2000 | Heaven et al. |
| 6,281,679 B1 | 8/2001 | King et al. |
| 6,494,047 B2 | 12/2002 | Yeung |
| 6,874,693 B2 | 4/2005 | Readio et al. |
| 7,494,567 B2 | 2/2009 | Haran |
| 7,619,193 B2 | 11/2009 | Deurenberg |
| 2005/0262724 A1* | 12/2005 | Kolb et al. ...................... 34/449 |
| 2008/0024557 A1* | 1/2008 | Moynihan ....................... 347/56 |
| 2008/0203076 A1* | 8/2008 | Gelbart ......................... 219/201 |
| 2010/0045720 A1* | 2/2010 | Williams et al. ................ 347/14 |
| 2010/0322602 A1* | 12/2010 | Leighton et al. .............. 392/416 |

* cited by examiner

*Primary Examiner* — Mohammad Ali
*Assistant Examiner* — Nathan Laughlin
(74) *Attorney, Agent, or Firm* — Cascio Schmoyer & Zervas

(57) ABSTRACT

Paper and continuous web scanners operate at varying and high temperature conditions. Regulating the temperature within the measurement gap between dual scanner heads during measurement and calibration modes of operation by employing air wipe and sheet guide temperature control assures consistent and accuracy sensor measurements of sheet characteristics. Air wipes blow pre-heated air into the measurement and the sheet guides are heated. The air temperature fluctuations that otherwise caused significant adverse effects on the sensors that measure, for example, the basis weight, ash content, and thickness of the moving sheet, are eliminated.

20 Claims, 2 Drawing Sheets

AIR WIPE AND SHEET GUIDE TEMPERATURE CONTROL ON PAPER AND CONTINUOUS WEB SCANNERS

FIELD OF THE INVENTION

The present invention generally relates to scanner measurement systems for determining parameters of continuous sheet materials during production and, more particularly, to techniques for controlling and stabilizing the ambient temperature profile adjacent the scanner sensors during on-sheet and off-sheet operations.

BACKGROUND OF THE INVENTION

It is often desirable to obtain measurements of selected characteristics of sheet materials during manufacture. Although various properties of sheet materials can be detected by off-line laboratory testing, this procedure is often not practical because of the time required for sample acquisition and analysis. Also, laboratory testing has the shortcoming that samples obtained for testing may not accurately represent sheet material that has been produced.

To overcome the drawbacks of laboratory testing of sheet materials, various sensor systems have been developed for detecting sheet properties "on-line," i.e., on a sheet-making machine while it is operating. Sensors for continuous flat sheet production processes typically employ single or double-sided packages with on-line sensors that traverse or scan traveling webs of sheet material during manufacture. Scanning usually is done in the cross direction, i.e., in the direction perpendicular to the direction of sheet travel. Depending upon the sheet-making operation, cross-directional distances can range up to about twelve meters or more. In the paper making art, for instance, the on-line sensors detect variables such as basis weight, moisture content, and caliper of sheets during manufacture.

On-line measurements during the production of continuous sheet materials are difficult to make accurately. One factor affecting the accuracy of on-line measurements is the fluctuation in the ambient temperature at the vicinities of the various sensors employed in the scanner system. The temperature variations may be caused by changes in the temperature of the sheet material itself as well as by external influences.

SUMMARY OF THE INVENTION

The present invention is directed to techniques for controlling the temperature within the measurement gap between dual scanner heads during measurement and/or calibration modes of operation. Paper and continuous web scanners are often operated at varying and high temperature conditions. The air temperature fluctuations can have significant adverse effects on the sensors that measure, for example, the basis weight, ash content, and thickness of the moving sheet. To alleviate this problem, scanners can be equipped with air wipes which blow pre-heated air into the measurement gap; in addition, the sensor head mounting plates or sheet guides can be heated as well.

The invention is based in part on the recognition that in order to minimize temperature-induced variations during off-sheet operations when the sensors are being calibrated, it is preferred to maintain the temperature within the measurement gap at substantially the same temperature as during the on-sheet measurement mode when the sheet is moving within the gap. In this fashion, the scanning sensors produce more consistent and accurate readings In one aspect, the invention is directed to a system for controlling the temperature in a measurement gap adapted to accommodate a continuous web, having a first side and a second side, that travels in a downstream direction, which includes:

(a) a first mounting head disposed adjacent to a first side of the web, the first mounting head including:
a first operative surface facing the first side of the web;
means for heating the first operative surface; and
means for measuring the temperature of the first operative surface;

(b) a second mounting head disposed adjacent to a second side of the web, the second mounting head including:
a second operative surface facing the second side of the web, wherein the first operative surface and the second operative surface define the measurement gap through which the continuous web travels, and wherein the measurement gap has a web entry end and a web exit end that is downstream from the web entry end;
means for heating the second operative surface; and
means for measuring the temperature of the second operative surface;

(c) temperature sensor to detect the ambient temperature within the measurement gap and that generates signals representative of the ambient temperature;

(d) means for supplying a heated gas at the web entry end such that the heated gas flows continuously into the measurement gap via the web entry end and out of the measurement gap through the web exit end;

(e) computing means in communication with the temperature sensor to process the signals to generate a gap temperature profile and that stores a predetermined desired gap temperature profile; and (f) control means in communication with the computing means for controlling the temperature of the heated gas that is supplied, the means for heating the first operative surface, and the means for heating the second operative surface to correct for deviation from the desired gap temperature profile.

In another aspect, the invention is directed to a control system to regulate the ambient temperature of a measurement gap adjacent a target area of a moving sheet being monitored. The measurement gap is within a dual head scanner having at least one sensor for continuous on-line measurement of one or more characteristics of a moving sheet. The dual head scanner includes a first head having a first plate and a second head having a second plate, wherein the sensor is mounted in either the first head or second head or in both, and wherein the first plate and second plate define a measurement gap through which the sheet travels. The dual head scantier further includes plate detectors for measuring the temperature of the first and second plates and air detectors for measuring the ambient air temperature in the measurement gap. The inventive control system includes:

means for heating the first plate that includes a first associated adjustable actuator that regulates the temperature of the first plate;

means for heating the second plate that includes a second associated adjustable actuator that regulates the temperature of the second plate;

means for injecting a heated gas at a web entry end of the measurement gap, such that the heated gas flows continuously into the measurement gap via the web entry end and out of the measurement gap through a web exit end, and that includes a third adjustable actuator that regulates the flow rate and/or temperature of the heated gas;

air temperature sensor for measuring the ambient air temperature of the measurement gap adjacent the target area and for generating signals representative of the ambient air temperature;

plate temperature sensor for measuring the temperatures of the first and second plates; and controller means that is in communication with the air temperature sensor to provide control signals to actuate at least one of the first associated adjustable actuator, the second associated adjustable actuator, and third associated adjustable actuator in order to maintain the temperature of the ambient air temperature of the measurement gap adjacent the target area to within a desired temperature range and to maintain the first and second plate temperatures within a desired temperature range.

In a further aspect, the invention is directed to a method of controlling the ambient temperature within an air gap within a dual head scanner through which a continuous web travels, the air gap being defined by (i) a first head that has a first operative surface that is connected to a first plate actuator for heating the first operative surface and (ii) a second head that has a second operative surface that is connected to a second plate actuator for heating the second operative surface, and wherein the air gap has heated gas injected therein at a web entry end from a source of heated gas that is connected to a third air actuator for regulating the flow and/or temperature of the heated gas, the method includes the steps of:

detecting the ambient temperature within the air gap with air sensors positioned on the first operative surface and on the second operative surface and generating air temperature signals indicating the ambient temperature;

detecting the plate temperatures of the first and second operative surfaces with plate temperature sensors positioned on the first operative surface and on the second operative surface and generating plate temperature signals indicating the first and second operative surface temperatures;

analyzing the air temperature and plate temperature signals and generating target air temperature and target plate temperature set points to be used for heat control during off sheet and on sheet modes of operations, wherein initial target first and second plate temperatures are selected from the steady state temperatures of the first and second plates during on sheet operations with the first and second plate actuators being set to a typical value of between 10% to 40% and wherein an initial target air gap temperature is selected from the steady state temperature of the air gap during on sheet operations with the third air actuator power being set to a typical value between 10% to 40%;

comparing actual first and second plate temperatures and air gap temperature to the respective target temperatures and generating error information based on the comparison; and sending the error information to either a first or second control loop wherein the first control loop, when active, operates when the dual head scanner is in an on sheet mode and the second control loop, when active, operates when the dual head scanner is in an off sheet mode to allow manipulation of set points of at least one of the first plate actuator, second plate actuator, and third air actuator to correct deviations from a desired air gap temperature profile, and wherein the set points for the control loop that is not active are stored as a starting point to enable fast reaction when the state of operation is switched between the on sheet and off sheet modes of operation.

DESCRIPTION PREFERRED EMBODIMENTS

Figure 1:
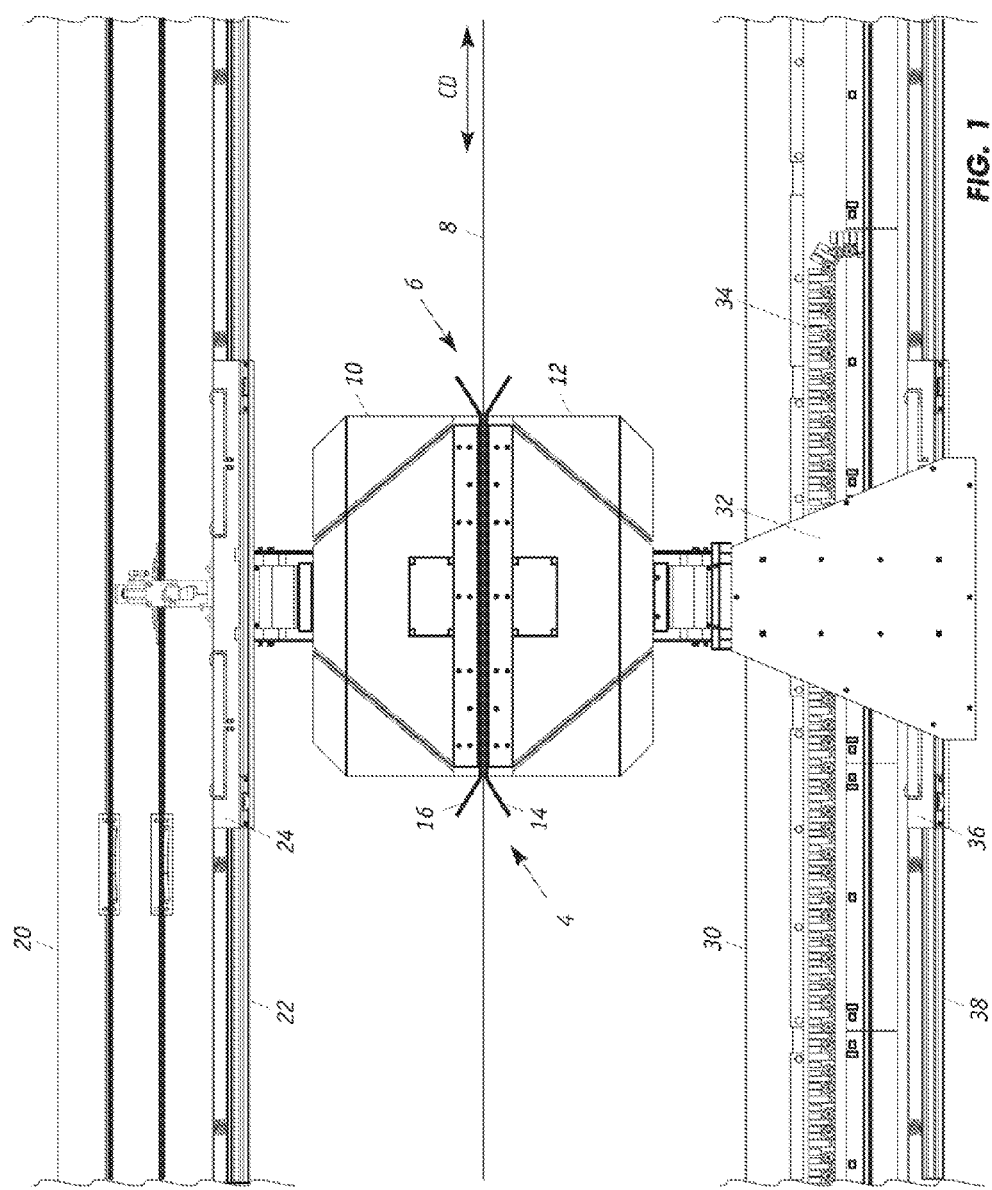
FIG. 1 illustrates a scanner system employing dual sensor heads or halves.

FIG. 1 shows a scanning system with scanner sensor heads 10 and 12. This dual scanner head configuration, which employs dual sensor heads, is typically employed when the sensor is operating in the transmission mode. For example, upper sensor head 10 may house a source of infrared radiation while the lower sensor head 12 houses an infrared detector that measures the radiation that is transmitted through the material being monitored. The upper scanner head 10 is supported by an upper support beam 20 that has a lower surface to which a series of laterally spaced apart rigid support structures is mounted. These vertical structures support track 22. A roller carriage 24 engages track 22 as the carriage advances along the cross direction to a moving sheet 8. The lower scanner head 12 is supported by a lower support beam 30 that has a lower surface on which a plurality of laterally spaced apart rigid support structures is mounted. Movement of the roller carriage is facilitated by a drive mechanism similar to that of the upper scanner head. Vertical structures also support track 38 onto which carriage 36 is engaged. A power chain 34 supplies electricity and electrical signal to lower scanner head 12. Lower sensor head 12 is mounted on a member 32 that extends from roller carriage 36 so as to position lower sensor head 12 adjacent to upper scanner head 10. The operative faces or plates 14, 16 of the lower and upper scanner heads 12, 10 define a measurement gap through which a web of material 8, such as paper, moves. Lateral openings 4 and 6 of the measurement gap allow the scanner to move in the cross direction (CD) as the paper travels in the machine direction, which is perpendicular to the CD. The movement of the dual scanner heads 10, 12, is synchronized with respect to speed and direction so that they are aligned with each other. Scanning systems having sensor components on opposite sides of the sheet being analyzed are described, for example, in U.S. Pat. No. 5,773,714 to Shead and U.S. Pat. No. 5,166,748 to Dahlquist, which are incorporated herein by reference.

In practice, scanner heads 10, 12 serve as platforms for carrying sensors to detect sheet properties, such as basis weight, in the case of paper. So, for example, lower scanner head 12 may carry a radiation source, such as a nuclear beta radian source, and upper scanner head 10 may carry a detector. In this case, the sensors can be employed to make basis weight measurements by measuring the radiation intensity incident on the detector when a sheet is present as compared to the beta radiation that is incident upon the detector, when no sheet is present; that is, the basis weight is measured by the beta radiation attenuated by the sheet material.

Alternatively, to measure the moisture content of paper, an infrared radiation source can be positioned in the lower scanner head 12 and the radiation that is transmitted through the paper is captured by a detector that is located in the upper scanner head 10. Analysis of the transmitted radiation yields the moisture content. Exemplary scanning dual head sensors are described, for example, in U.S. Pat. No. 5,654,799 to Chase et al., U.S. Pat. No. 5,793,486 to Gordon et al., and U.S. Pat. No. 7,494,567 to Haran, which are incorporated herein by reference.

Figure 2:
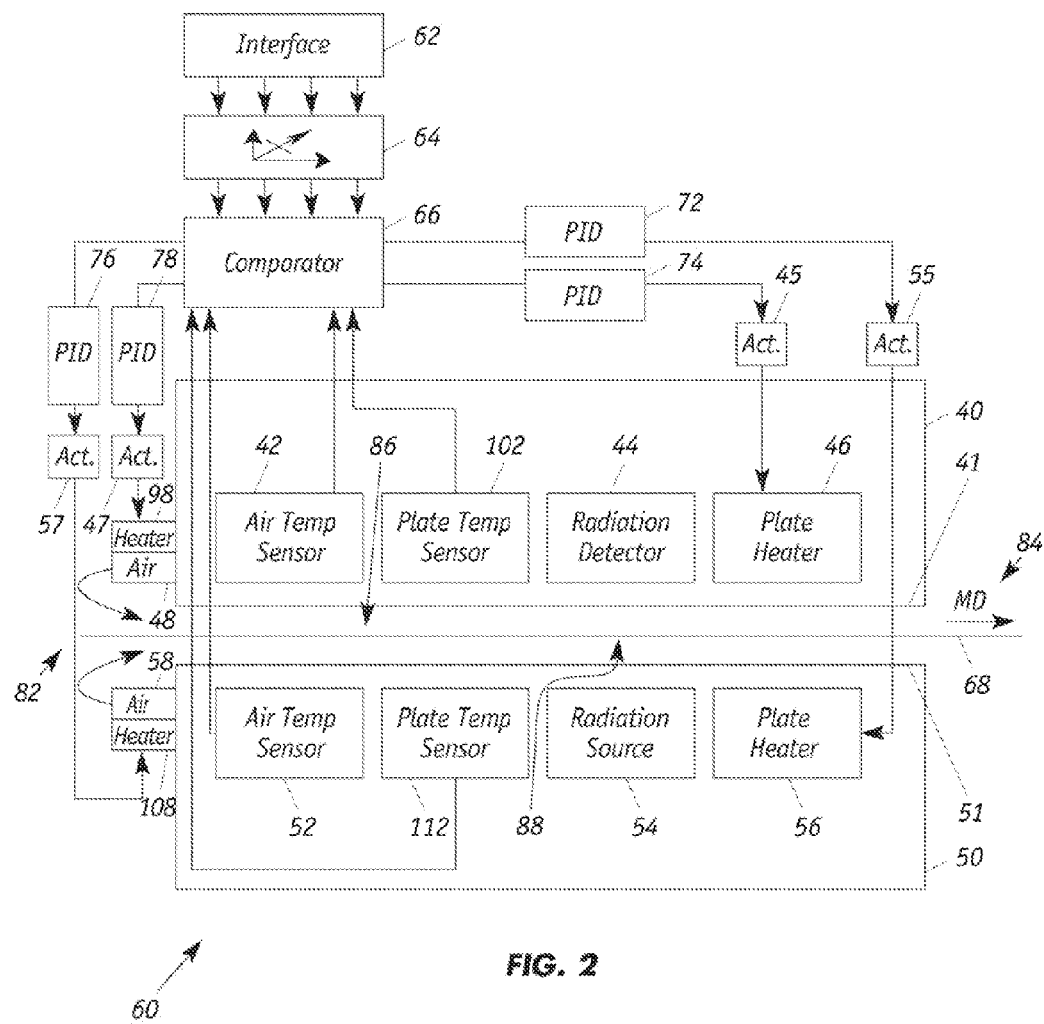
FIG. 2 is a schematic depicting the control system for the dual sensor heads.

FIG. 2 depicts a control system 60 to regulate the ambient air and plate temperature in the measurement gap 86 that is formed between upper scanner head 40 and lower scanner head 50. A continuous web or sheet 68 of material travels in the machine direction (MD) through web entry end 82, into measurement gap 86, and out via web exit 84. The height of the measurement gap 86 varies depending on, among other things, the material of sheet 68. For paper that is being made in an industrial papermaking machine, the height can range from 10 to 30 mm and more as paper moves through at speeds of 1000 m/min. and more. Plate surface 41 of upper scanner head 40 serves as an upper sheet guide and plate surface 52 of lower scanner head 50 serves a lower sheet guide. Mounted within upper scanner head 40 are air temperature sensor 42, plate temperature sensor 102 and plate heater 46. Similarly, mounted within lower scanner head 50 are air temperature sensor 52, plate temperature sensor 112 and plate heater 56. The air and plate temperature sensors can comprise thermocouples. In practice, a plurality of air temperature sensors is employed in the upper and lower scanner heads 40, 50 and averages of the air temperature readings are used. In addition, a plurality of plate temperature sensors is employed in the upper and lower scanner heads 40, 50. Each of plate heaters 46 and 56 can comprise a plurality of uniformly distributed resistive heating elements for heating plate surfaces 41 and 51, respectively.

The dual head scanner can be employed to measure a variety of characteristics of the web 68. For instance, infrared radiation from radiation source 54 in lower scanner head 50 can be directed through a target area 88 on web 68. Radiation detector 44 captures the radiation that is transmitted through and web and analysis of the detected radiation yields the moisture content in the web. The present invention is not limited to any particular sensor device that is incorporated in the dual sensor heads.

Air temperature sensors 42, 52 measure the air temperature in measurement gap 86. Plate heaters 46, 56, which are regulated by actuators 45, 55, respectively, provide uniform temperature control along the upper and lower plates (or sheet guides) 41 and 51, respectively. Sources of gas (referred to as "air wipes") 48, 58 direct streams of gas through a plurality of nozzles arranged in the CD at web entry 82 and into measurement gap 86. The temperature of the air can be heated with heaters 98 and 108 that are regulated by actuators 47 and 57, respectively. In this fashion, the temperature of the preheated gas that is blown into the measurement gap 86 along can be controlled.

The control system 60 further includes a user interface 62 and processing unit 64. Operating parameters are input into interface 62 whereby the processing unit 64 calculates the set points for plate heaters 46, 56 and air wipe heaters 98, 108. In the case of papermaking, operating parameters might include, for example, measurement gap height, ambient temperature and humidity levels, and desired temperature range at the target area 88 and air wipe flow rates and gas temperature range. In operation in the measurement mode, in response to the feedback signals from the air temperature sensors 42, 52 and plate temperature sensors 102, 112 are compared to the set points, comparator 66, PID (proportional-integral-derivative) controllers 72, 74 adjust actuators 55, 45 based on the difference in the feedback values and set points. Similarly, PID controllers 76, 78 adjust actuators 57, 47 based on the difference in the feedback values and set points.

A preferred technique of establishing the initial target first and second plate temperatures are to use the steady state temperatures of the first and second plates during on sheet operations with the first and second plate heaters operating at less than 50% capacity and typically at between 10% to 40% of maximum. Similarly, the initial target air gap temperature can be selected from the steady state temperature of the air gap during on sheet operations with the air wipe temperature at less than 50% and typically at between 10% to 40% of maximum.

It is often necessary to the sheet making process is to go off sheet for routine maintenance, during startup, or change over to a different product etc. During off sheet operations, the sensors in the dual scanner heads are calibrated. Exemplary techniques for calibrating sensors in dual scanner heads are described, for example, in U.S. Pat. No. 4,692,616 to Hegland et al., U.S. Pat. No. 5,092,678 to Chase et al., and U.S. Pat. No. 6,281,679 to King et al., which are incorporated herein by reference.

With the present invention, it is preferred that during the calibration mode, when continuous web 68 is not present in measurement gap 86, that the temperature profile within measurement gap 86 be maintained particularly in the vicinity of target area 88 so that when the sensors are calibrated under the same conditions as during the measurement mode. This is achieved by continuing to operate the control system with the proviso that no continuous web is passing through. In the case where the measurement mode operates at elevated temperatures as when the paper's temperature is already high relative to ambient conditions as it enters web entry 82, it will be necessary to increase the air wipe 48, 58 gas temperature and/or gas heat flow rate and increase the temperatures of plate surfaces 41, 51.

In papermaking operations, the plates are typically maintained at a temperature that ranges from 30° C. to 150° C. and the preheated gas through the air wipes is typically maintained at a temperature that ranges from 30° C. to 100° C. This allows the ambient air temperature in the measurement gap to be stabilized at a temperature of between 30° C. to 150° C. during both on sheet and off sheet modes.

In order to decrease the time it takes to stabilize the PID control loop between on sheet and off sheet conditions, it is useful to employ two control loops, one for each condition. When switching to a new condition, that is, from on sheet to off sheet, the on sheet control loop set point is saved and used as a starting point when it is reactivated again when going from off sheet back to on sheet. In this manner, large heater set point control changes can be made with the benefit of prior knowledge of what set point reduced error most when last in that on sheet or off sheet operating mode.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A system for controlling the temperature in a measurement gap adapted to accommodate a continuous web, having a first side and a second side, that travels in a downstream direction, which comprises:
   (a) a first sensor head disposed adjacent to a first side of the web, the first sensor head including:
      a first operative surface facing the first side of the web;
      means for heating the first operative surface; and
      means for measuring the temperature of the first operative surface;
   (b) a second sensor head disposed adjacent to a second side of the web, the second sensor head including:
      a second operative surface facing the second side of the web, wherein the first operative surface and the second operative surface define the measurement gap through which the continuous web travels, and wherein the measurement gap has a web entry end and a web exit end that is downstream from the web entry end;

means for heating the second operative surface; and means for measuring the temperature of the second operative surface;

(c) temperature sensor to detect the ambient temperature within the measurement gap and that generates signals representative of the ambient temperature;

(d) means for supplying a heated gas at the web entry end such that the heated gas flows continuously into the measurement gap via the web entry end and out of the measurement gap through the web exit end;

(e) computing means in communication with the temperature sensor to process the signals to generate a gap temperature profile and that stores a predetermined desired gap temperature profile; and (f) control means in communication with the computing means for controlling the temperature of the heated gas that is supplied, the means for heating the first operative surface, and the means for heating the second operative surface to correct for deviation from the desired gap temperature profile.

2. The system of claim 1 wherein the means for heating the first operative surface comprises a plurality of first heating devices incorporated in the first operative surface and the means for heating the second operative surface comprises a plurality of second heating devices incorporated in the second operative surface and wherein the control means regulates the amount energy generated by the first and second heating devices and the of temperature of the heated gas.

3. The system of claim 1 wherein the means for supplying a heated gas at the web entry comprises a source of heated gas and a first nozzle that directs a stream of heated gas toward the first side of the web and a second nozzle that directs a stream of heated gas toward the second side of the web.

4. The system of claim 1 wherein at least one of the first sensor head or second sensor head includes a sensor that measures one or more characteristics of the continuous web and the controller means maintains the temperature in the vicinity of the sensor within a defined range regardless of whether the continuous web is moving within the measurement gap or not.

5. The system of claim 1 wherein the control means regulates a first control loop when the measurement gap is in an on sheet mode with the continuous web traveling therein and regulates a second control loop when the measurement gap is in an of sheet mode without the continuous web traveling therein.

6. A control system to regulate the ambient temperature of a measurement gap adjacent a target area within a dual head scanner having at least one sensor for continuous on-line measurement of one or more characteristics of a moving sheet, wherein the dual head scanner includes a first head having a first plate and a second head having a second plate, wherein the at least one sensor is mounted in either the first head or second head or in both, and wherein the first plate and second plate define a measurement gap through which the sheet travels, the control system comprising:

means for heating the first plate that includes a first associated adjustable actuator that regulates the temperature of the first plate;

means for heating the second plate that includes a second associated adjustable actuator that regulates the temperature of the second plate;

means for injecting a heated gas at a web entry end of the measurement gap, such that the heated gas flows continuously into the measurement gap via the web entry end and out of the gap through a web exit end, and that includes a third adjustable actuator that regulates the flow rate and/or temperature of the heated gas wherein the means for injecting the heated gas comprises at least one nozzle located exterior of the web entry end to supply heated gas into and through the measurement gap;

air temperature sensor for measuring the ambient air temperature of the measurement gap adjacent the target area and for generating signals representative of the ambient air temperature;

plate temperature sensor for measuring the temperatures of the first and second plates; and controller means that is in communication with the air temperature sensor to provide control signals to actuate at least one of the first associated adjustable actuator, the second associated adjustable actuator, and third associated adjustable actuator in order to maintain the temperature of the ambient air temperature of the measurement gap adjacent the target area to within a desired air temperature range and to maintain the first and second plate temperatures within a desired plate temperature range.

7. The control system of claim 6 wherein the means for heating the first plate and the means for heating the second plate are positioned to provide uniform heating along the first and second plate surfaces.

8. The control system of claim 6 wherein the means for injecting a heated gas comprises a source of heated gas and a first nozzle that directs a stream of heated gas toward a first side of the web and a second nozzle that directs a stream of heated gas toward a second side of the web wherein the first and second nozzles are located exterior of the web entry end to supply heated gas into and through the measurement gap.

9. The control system of claim 6 wherein the moving sheet comprises paper and wherein the sheet travels in a machine direction and the dual head scanner moves in a cross direction which is perpendicular to the machine direction.

10. A control system to regulate the ambient temperature of a measurement gap adjacent a target area within a dual head scanner having at least one sensor for continuous on-line measurement of one or more characteristics of a moving sheet, wherein the dual head scanner includes a first head having a first plate and a second head having a second plate, wherein the at least one sensor is mounted in either the first head or second head or in both, and wherein the first plate and second plate define a measurement gap through which the sheet travels, the control system comprising:

means for heating the first plate that includes a first associated adjustable actuator that regulates the temperature of the first plate;

means for heating the second plate that includes a second associated adjustable actuator that regulates the temperature of the second plate;

means for injecting a heated gas at a web entry end of the measurement gap, such that the heated gas flows continuously into the measurement gap via the web entry end and out of the gap through a web exit end, and that includes a third adjustable actuator that regulates the flow rate and/or temperature of the heated;

air temperature sensor for measuring the ambient air temperature of the measurement gap adjacent the target area and for generating signals representative of the ambient air temperature, plate temperature sensor for measuring the temperatures of the first and second plates; and controller means that is in communication with the air temperature sensor to provide control signals to actuate at least one of the first associated adjustable actuator, the second associated adjustable actuator, and third associated adjustable actuator in order to maintain the temperature of the ambient air temperature of the measurement gap adjacent the target area to within a desired air temperature range and to maintain the first and second plate temperatures within a desired temperature range and wherein the controller means maintains the ambient air temperature in the measurement gap at the air desired temperature range and maintains the first and second plate temperatures within the desired plate temperature range even when a moving sheet is not present in the gap.

11. A control system to regulate the ambient temperature of a measurement cap adjacent a target area within a dual head scanner having at least one sensor for continuous online measurement of one or more characteristics of a moving sheet, wherein the dual head scanner includes a first head having a first plate and a second head having a second plate, wherein the at least one sensor is mounted in either the first head or second head or in both, and wherein the first plate and second plate define a measurement gap through which the sheet travels, the control system comprising:

means for heating the first plate that includes a first associated adjustable actuator that regulate the temperature of the first plate;

means for heating the second plate that includes a second associated adjustable actuator that regulates the temperature of the second plate;

means for injecting a heated gas at a web entry end of the measurement gap, such that the heated gas flows continuously into the measurement gap via the web entry end and out of the cap through a web exit end, and that includes a third adjustable actuator that regulates the flow rate and/or temperature of the heated;

air temperature sensor for measuring the ambient air temperature of the measurement gap adjacent the target area and for generating signals representative of the ambient air temperature;

plate temperature sensor for measuring the temperatures of the first and second plates; and controller means that is in communication with the air temperature sensor to provide control signals to actuate at least one of the first associated adjustable actuator, the second associated adjustable actuator, and third associated adjustable actuator in order to maintain the temperature of the ambient air temperature of the measurement gap adjacent the target area to within a desired air temperature range and to maintain the first and second plate temperatures within a desired plate temperature range and wherein the controller means regulates a first control loop when the dual head scanner is in an on sheet mode with the sheet traveling therein and regulates a second control loop when the dual head scanner is in an off sheet mode without the sheet traveling therein.

12. A method of controlling the ambient temperature within an air gap within a dual head scanner through which a continuous web travels, the air gap being defined by (i) a first head that has a first operative surface that is connected to a first plate actuator for heating the first operative surface and (ii) a second head that has a second operative surface that is connected to a second plate actuator for heating the second operative surface, and wherein the air gap has heated was injected therein at a web entry end from a source of heated gas that is connected to a third air actuator for regulating the flow and/or temperature of the heated gas, the method comprising the steps of:

detecting the ambient temperature within the air gap with air sensors positioned on the first operative surface and on the second operative surface and generating air temperature signals indicating the ambient temperature, detecting the plate temperatures of the first and second operative surfaces with plate temperature sensors positioned on the first operative surface and on the second operative surface and generating plate temperature signals indicating the first and second operative surface temperatures;

analyzing the air temperature and plate temperature signals and generating target air temperature and target plate temperature set points to be used for heat control during off sheet and on sheet modes of operations, wherein initial target first and second plate temperatures are selected from the steady state temperatures of the first and second plates during on sheet operations and an initial target air gap temperature is selected from the steady state temperature of the air gap during on sheet operations;

comparing actual first and second plate temperatures and air gap temperature to the respective target temperatures and generating error information based on the comparison; and sending the error information to either a first or second control loop wherein the first control loop, when active, operates when the dual head scanner is in an on sheet mode and the second control loop, when active, operates when the dual head scanner is in an off sheet mode to allow manipulation of set points of at least one of the first plate actuator, second plate actuator, and third air actuator to correct deviations from a desired air gap temperature profile and wherein the set points for the control loop that is not active are stored as a starting point to enable responsive reaction when the state of operation is switched between the on sheet and off sheet modes of operation.

13. The method of claim 12 wherein the initial target first and second plate temperatures are selected from the steady state temperatures of the first and second plates during on sheet operations with the first and second plate actuators being set to a value of between 10% to 40% of maximum and the initial target air gap temperature is selected front the steady state temperature of the air gap during on sheet operations with the third air actuator power being set to a value between 10% to 40% of maximum.

14. The method of claim 12 wherein the temperature of the first plate and the temperature of the second plate are maintained within the same temperature ranges in both the on sheet and off sheet modes of operation.

15. The method of claim 12 wherein in the on sheet mode of operation a continuous web travels through the air gap as one or more characteristics of the continuous web is measured with one or more sensors that are positioned in the first or second heads.

16. The method of claim 15 further comprising the steps of:
removing the continuous web from the air gap; and
switching to the off sheet mode of operation while maintaining the temperature of the first plate and the temperature of the second plate in the same temperature ranges as when the continuous web was within the gap in the on sheet mode of operation.

17. The method of claim 16 wherein the one or more sensors is calibrated in the off sheet mode of operation.

18. The method of claim 12 wherein the continuous web comprises paper.

19. The method of claim 12 wherein heated gas is injected through a first nozzle that directs a stream of heated gas toward a first side of the continuous web and a through a second nozzle that directs a stream of heated gas toward a second side of the continuous web.

20. The method of claim 12 wherein the first plate actuator and the second plate actuator are positioned to provide uniform heating along the first and second plate surfaces.

* * * * *